United States Patent [19]

Sakamaki

[11] 3,759,534
[45] Sept. 18, 1973

[54] APEX SEAL FOR ROTARY PISTON ENGINE

[75] Inventor: Hiroshi Sakamaki, Utsunomiya-shi, Tochigi, Japan

[73] Assignee: Nippon Piston Ring Co., Ltd., Tokyo, Japan

[22] Filed: Oct. 21, 1971

[21] Appl. No.: 191,286

[30] Foreign Application Priority Data
Oct. 24, 1970 Japan.............................. 45/105981

[52] U.S. Cl.............. 277/235 R, 418/178, 418/120
[51] Int. Cl............................................. F16j 15/65
[58] Field of Search....................277/235, 235 A; 418/178, 179, 120, 113, 122, 123, 124

[56] References Cited
UNITED STATES PATENTS
3,180,564  4/1965  Fuhrmann.......................... 418/178
238,603    3/1881  Medden............................. 418/179
3,452,680  7/1969  White................................ 418/179

Primary Examiner—George E. Lowrance
Assistant Examiner—Robert I. Smith
Attorney—Sughrue, Rothwell, Mion, Zinn & Macpeak

[57] ABSTRACT

An apex seal for a rotary piston engine is so constructed as to have a head portion with a circular sliding surface. It is made of a metal preferably cast iron, and has a base portion for supporting the head portion, which is made of a heat resistant light metal alloy, synthetic resin, or non-metallic material.

1 Claim, 8 Drawing Figures

APEX SEAL FOR ROTARY PISTON ENGINE

BACKGROUND OF THE INVENTION

1. Field of the Invention

This invention relates to an apex seal employed between the rotor and the center housing of a rotary engine.

2. Description of the Prior Art

Apex seals are mounted on the apex portions of the rotor for ensuring fluid-tightness while the rotor rotates inside of the center housing of a multi-circular configuration with the apex seal contacting the inner surface of the center housing. For assuring the satisfactory fluid-tightness of the apex seal, the apex seal is heavily depressed onto the inner surface of the center housing not only by a number of springs provided between the rear side of the apex seal and the apex portions of the rotor, but also by the centrifugal force caused by the mass of the apex seal, gas pressure by the operational fluid (or gas), and the like. As a result, wear of the inner surface of the center housing and of the apex seal are excessive, and there is also a tendency of causing irregular wear on the internal surface of the center housing. Above all of the considerable reasons for creating irregular wear, the most serious one is in the mass of the apex seal.

To be more specific, the frictional force caused between the apex seal and the internal surface of the center housing owing to the centrifugal force caused by the rotation of the rotor increases in proportion to the mass of the apex seal. Thus, it will be apparent that the mass of the apex seal is better reduced as low as possible, and furthermore, wear-resistivity, mechanical strength, and also a self-lubricating nature are desired for the apex seal.

With this respect, the conventional apex seal made of cast iron is found to be defective because of its specific gravity equalling to 7.3, regardless of the fact that it has superior wear-resistivity, mechanical strength, and self-lubricating nature. For overcoming the above described difficulty, a proposal has been also made which provides hollow spaces inside the apex seal so that the mass of the apex seal is thereby decreased. However, the provision of the hollow spaces is difficult in manufacture, will not decrease the mass sufficiently, and has a tendency of lowering the mechanical strength of the apex seal. For this reason, such a construction of the apex seal is not employed widely in practice.

SUMMARY OF THE INVENTION

Therefore, a primary object of the present invention is to provide an improved apex seal for a rotary engine wherein all of the above described drawbacks of the conventional apex seals are substantially overcome.

Another object of the present invention is to provide an improved apex seal wherein the problem of the mass can be solved with all of the advantageous features such as the wear-resistivity, mechanical strength, and the self-lubricating nature being entirely preserved.

These and other objects of the present invention can be achieved by an improved apex seal according to the present invention which comprises an apex portion having a circular sliding surface and made of a metal particularly such as cast iron, and a base portion supporting the apex portion made of a heat-resistive light metal, a synthetic resin, or other non-metallic material.

The nature, principle, and utility of the present invention will be better understood from the following detailed description of the invention when read in conjunction with the accompanying drawing.

DETAILED DESCRIPTION OF THE INVENTION

Figure 1:
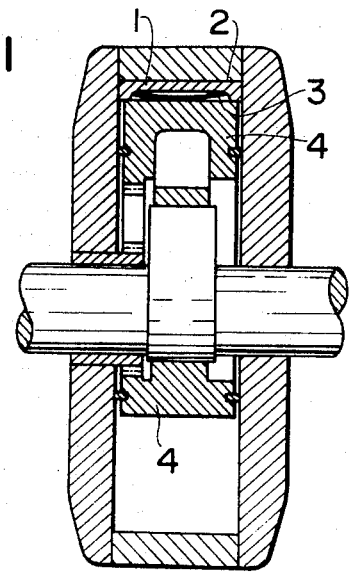
FIG. 1 is a vertical, sectional view of a conventional rotary piston engine wherein apex seals of a conventional type are employed.

Referring now to FIG. 1, there is indicated a conventional construction of a rotary engine having apex seals 1 provided on a rotor 4 which rotates inside of a center housing of the rotary engine with the apex seals contacting inner surface 2 of the center housing. A number of springs 3 are provided on the rear side of the apex seal for urging the apex seal toward the inner surface 2 of the center housing. However, when the apex seals are made of cast iron, the mass of the apex seal is excessively heavy although such an apex seal has been found to have advantageous features of superior wear-resistivity, high mechanical strength, and an adequate self-lubricating nature.

Figure 2:
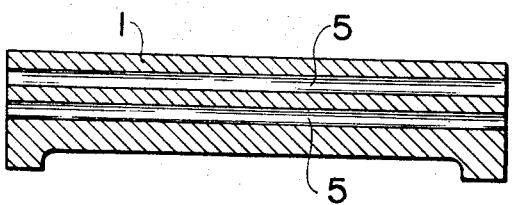
FIG. 2 is a longitudinal sectional view of a conventional apex seal.

In order to reduce the mass of the apex seal made of cast iron, a plurality of hollow spaces 5 have also been provided as shown in FIG. 2. However, this was also found not satisfactory in reducing the mass, although such a construction was found difficult in manufacture and the mechanical strength of the apex seal was thereby decreased.

Figure 3:
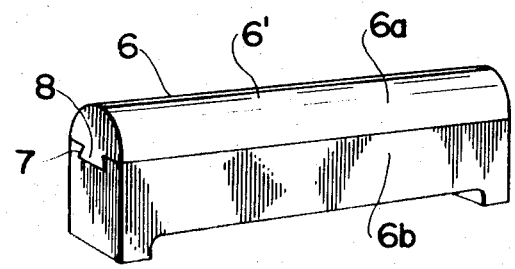
FIG. 3 is a perspective view showing an apex seal constituting an embodiment of the present invention.
Figure 4:
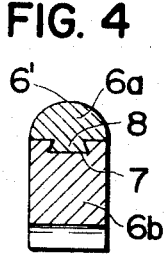
FIG. 4 is a sectional view taken along the line IV—IV in FIG. 3.
Figure 5:
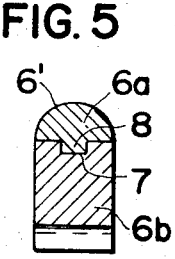
FIGS. 5 through 8 are views similar to FIG. 4 of other embodiments of the present invention.
Figure 6:
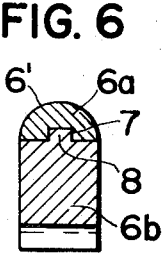
Figure 7:
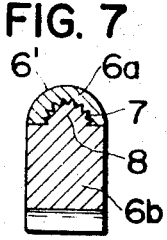
Figure 8:
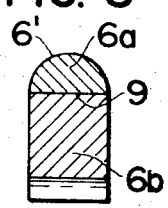

An apex seal constituting a preferred embodiment of the present invention is indicated in FIGS. 3 and 4, wherein the apex seal generally designated by 6 comprises a head portion 6a having a sliding surface 6' and a base portion 6b for supporting the head portion 6a. The base portion 6b is made of a heat resistant light metal alloy of a low specific gravity such as an aluminum alloy or a magnesium alloy, a synthetic resin, or of a non-metallic material such as carbon or the like. The head portion 6a is made of cast iron or like metal which is superior in wear-resistivity and self-lubricating nature. As is apparent from FIG. 4, which is a cross sectional view taken along the line IV—IV in FIG. 3, the head portion 6a of this embodiment is joined with the base portion 6b thereof employing a dovetailed construction. However, it will be apparent that the two portions 6a and 6b may also be joined together employing various other methods as shown in FIGS. 5 through 8. In the method shown in FIG. 5, a recessed portion 7 is provided in the base portion 6b, and a projecting portion 8 is provided on the head portion 6a, while in the methods shown in FIGS. 6 and 7, a recessed portion 7 is formed in the head portion 6a, and a projecting portion 8 of the shape conforming to that of the recessed portion 7 is provided on the base portion 6b. Otherwise, as shown in FIG. 8, flat joining surfaces 9 may be provided for both portions 6a and 6b, and the portions may be joined together by means of a bonding agent or the like. In all of the above described methods, the recessed portions 7 and the projecting portions 8 may be formed into any suitable configurations.

As will be apparent from the above description, the apex seal according to the present invention has a head portion 6a made of cast iron which is superior in the wear-resistivity and self-lubricating nature, and a base portion 6b made of a heat resistant light metal alloy of a low specific gravity, or a synthetic resin, or a non-metallic material, and for this reason the mass of the apex seal can be substantially reduced.

Summarizing the above description, the difficulty of the conventional apex seal made of cast iron having an excessively heavy mass despite the superiority in wear-resistivity, mechanical strength, and self-lubricating nature, can be eliminated by an improved construction of the apex seal wherein it is divided into a head portion 6a and a base portion 6b for supporting the head portion, and the base portion 6b is made of a material having a low specific gravity such as wear-resistive light metal alloy, synthetic resin, or a non-metallic material, so that the mass of the apex seal in its entirety can be substantially reduced with the retention of the superior natures of the cast iron apex seal.

What is claimed is:

1. An apex seal for a rotary piston engine in the form of a composite bar, said bar comprising a radially outer cast iron head portion having a rounded sliding surface and a bonded rectangular base portion of low specific gravity of one material selected from the group consisting of carbon, aluminum alloy, and magnesium alloy.

* * * * *